United States Patent [19]
Chu

[11] Patent Number: 6,098,213
[45] Date of Patent: Aug. 8, 2000

[54] WATER TEMPERATURE REGULATOR

[75] Inventor: Li-Tsan Chu, Taipei, Taiwan

[73] Assignee: Hen-Tsung Chen, Lin Ko Hsian, Taiwan

[21] Appl. No.: 09/292,909

[22] Filed: Apr. 16, 1999

[51] Int. Cl.[7] ................................................ A47K 3/28
[52] U.S. Cl. ........................ 4/597; 4/665; 137/334; 137/357; 137/351; 137/571
[58] Field of Search .................................. 137/334, 357, 137/551, 571; 4/597, 605, 665

[56] References Cited

U.S. PATENT DOCUMENTS

| | | | |
|---|---|---|---|
| 4,563,780 | 1/1986 | Pollack | 4/597 X |
| 4,759,382 | 7/1988 | Harel | 137/334 X |
| 5,140,714 | 8/1992 | Horenstein et al. | 4/597 |
| 5,165,456 | 11/1992 | Woolman | 4/597 X |
| 5,274,860 | 1/1994 | Avila | 4/605 X |
| 5,393,228 | 2/1995 | Policicchio | 4/597 X |
| 5,414,879 | 5/1995 | Hiraishi et al. | 4/605 X |

Primary Examiner—John Rivell
Attorney, Agent, or Firm—Pro-Techtor International Services

[57] ABSTRACT

A water temperature regulator having a closed container that is provided with a cold-water inlet pipe and a hot-water inlet pipe having flow control connected thereto for introducing cold and hot water, respectively, into the container at a desired flow rate, a discharge pipe for guiding water in the container to an external water storage, at least one water service pipe for guiding water in the container to at least one water supply outlet, such as a showerhead or a faucet, at least one control for controlling open/close of the discharge pipe and of the at least one water service pipe, and a water temperature indicator for showing a temperature of water in the container. Instead of being drained, water introduced into the container that has not reached a desired temperature is discharged to and stored in the water storage for reuse later without being unnecessarily wasted.

10 Claims, 5 Drawing Sheets

WATER TEMPERATURE REGULATOR

BACKGROUND OF THE INVENTION

The present invention relates to a water temperature regulator, and more particularly to a water temperature regulator that may not only regulate water temperature depending on personal preference or actual need but also help save valuable water resource, and is therefore very suitable for mounting in a bathroom and connecting to a plumbing system having a hot-water pipeline included therein.

General water heaters for family use can be divided into two types, namely, gas heater and electric heater.

When using a gas heater to supply hot water, water that has remained in the hot-water service pipe since last use of the heater would directly flow to the faucet instead of flowing through and heated by the heater. A user would usually turn open the hot-water faucet to release and drain such water that has not been heated. It is, of course, a pity to waste so much useful water only because the water is not heated to a desired temperature for our use. Such unnecessary waste of useful water occurs each time we turn open a hot-water faucet immediately after we ignite the gas heater. When there is finally hot water released from the hot-water faucet, the user would usually turn open the cold-water faucet at the same time in order to regulate the temperature of released hot water by mixing the cold and the hot water. A lot of valuable water resource and heat energy is therefore unnecessarily wasted in the course of obtaining a desired temperature of hot water supplied by the gas heater.

And, in the case of an electric heater, there would still be water unnecessarily wasted when the hot-water faucet is first turned open to let out hot water that has been heated but stored in the hot-water service pipe before the use. This is because the user would usually drain some hot water before it reaches a desired higher temperature. Such unnecessary waste of water would occur again when we turn open the faucets the next time. And, there are also chances that the user needs to lower the temperature of hot water by mixing it with some amount of cold water. This would also, of course, unnecessarily waste some heat energy used to heat the water.

The above two situations of unnecessary waste of water resource and heat energy frequently happen in almost every family houses. Therefore, it is desirable to develop a set of improved domestic water temperature regulator with which any water that is to be used but has not reached a desired temperature may be sent to a separate water storage for reuse later and thereby avoid unnecessary waste of water.

SUMMARY OF THE INVENTION

A primary object of the present invention is to provide a water temperature regulator that has means to display the temperature of water flowing through the regulator and means to guide water having a temperature lower than a desired value to a separate water storage for reuse later instead of being arbitrarily wasted.

To achieve the above and other objects, the present invention mainly includes a closed container on which a cold-water inlet pipe, a hot-water inlet pipe, a discharge pipe, a water service pipe, a control, and a water temperature indicator are provided.

The cold-water inlet pipe is connected to a cold-water pipe of a plumbing system in the house in order to introduce cold water into the container, and has a cold-water flow control connected thereto for regulating a flow of the cold water being introduced into the container via the cold-water inlet pipe.

The hot-water inlet pipe is connected to a hot-water pipe in the house plumbing system in order to introduce hot water into the container, and has a hot-water flow control connected thereto for regulating a flow of the hot water being introduced into the container via the hot-water inlet pipe.

The discharge pipe is connected to a pipeline in the house plumbing system for discharging water in the container to a water storage via the pipeline, and the pipeline has a check valve connected thereto to prevent water from flowing back into the container via the discharge pipe.

The water service pipe is led to a water supply outlet to allow water in the container to flow to the water supply outlet via the water service pipe.

The control controls open/close of the discharge pipe and the water service pipe at different time or close of the discharge pipe and the water service pipe at the same time, so that water in the container either flows out the container via the discharge pipe or the water service pipe or is stored in the container, depending on one of three control modes selected for the control.

The water temperature indicator includes a water temperature sensor and a water temperature display and is able to immediately show a temperature of water in the container.

BRIEF DESCRIPTION OF THE DRAWINGS

The above and other objects of the present invention and the features and functions thereof can be best understood by referring to the following detailed description of the preferred embodiments and the accompanying drawings, wherein.

DETAILED DESCRIPTION OF THE PREFERRED EMBODIMENTS

Figure 1:
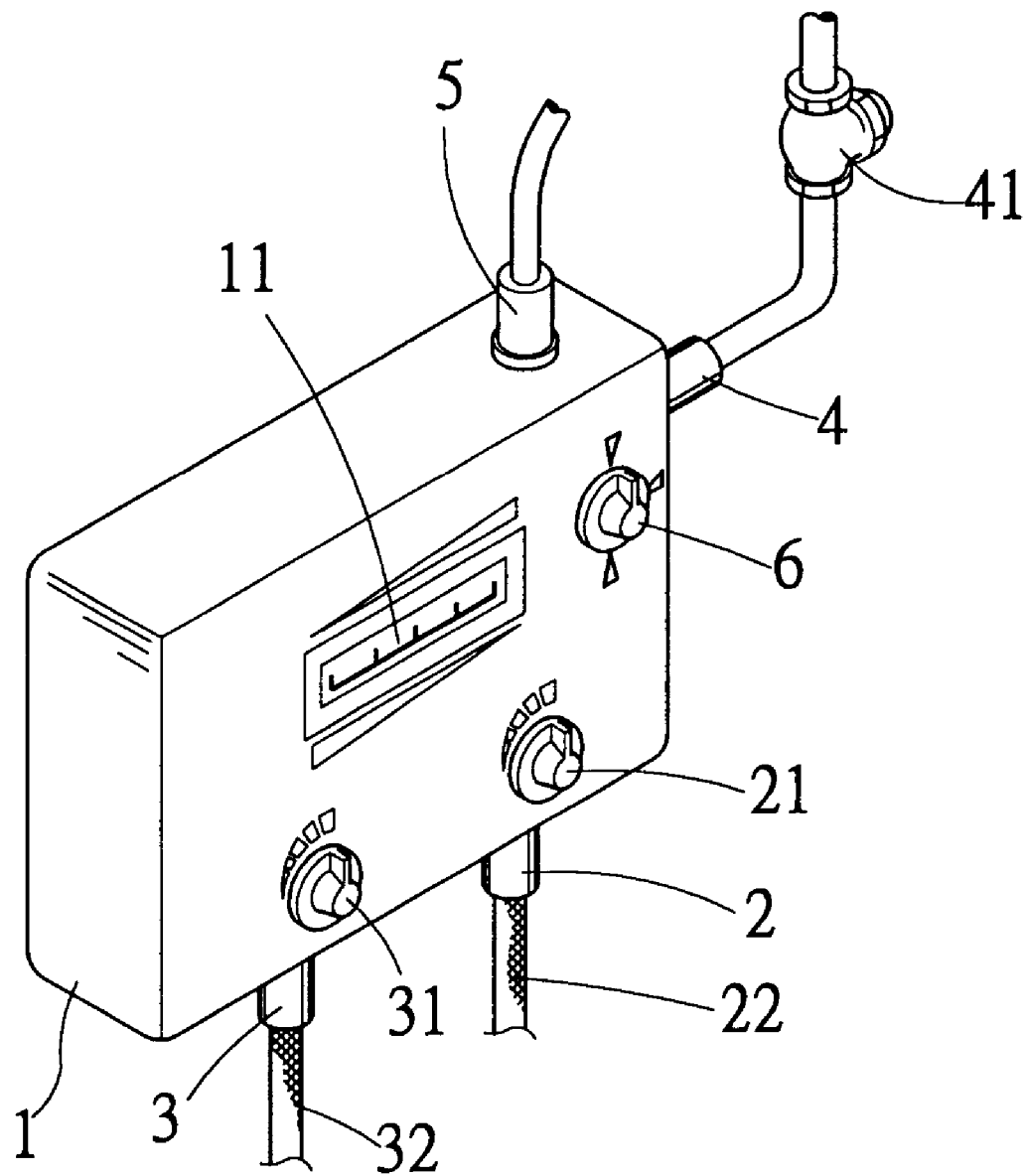
FIG. 1 is a perspective of a first embodiment of the present invention.

Please refer to FIG. 1 that shows a water temperature regulator according to a first embodiment of the present invention. As shown, the water temperature regulator includes a closed container 1 provided with a cold-water inlet pipe 2, a hot-water inlet pipe 3, a discharge pipe 4, a water service pipe 5, a control 6, and a water temperature indicator 11. The cold-water inlet pipe 2 downward extends from a right side of a bottom of the container 1 for connecting a cold-water pipe 22 thereto in order to introduce cold water into the container 1. A flow of the cold water introduced into the container 1 is regulated by a cold-water flow control 21 connected to the cold-water inlet pipe 2.

The hot-water inlet pipe 3 downward extends from a left side of the bottom of the container 1 for connecting a hot-water pipe 32 thereto in order to introduce hot water into the container 1. A flow of the hot water introduced into the container 1 is regulated by a hot-water flow control 31 connected to the hot-water inlet pipe 3.

The discharge pipe 4 sideward extends from an upper point on a right wall of the container 1 for discharging water in the container 1 via a pipeline connected to the discharge pipe 4. A check valve 41 is connected to the pipeline at a predetermined position to prevent water from flowing back into the container 1 via the discharge pipe 4.

The water service pipe 5 upward extends from a right side of a top of the container 1 to allow water in the container 1 to flow out for service via the water service pipe 5.

The control 6 is located at a top right corner of a front of the container 1 for controlling the open of the discharge pipe 4 or the water service pipe 5 at different time or the close of the discharge pipe 4 and the water service pipe 5 at the same time, so that water in the container 1 either flows out the container 1 via the discharge pipe 4 or the water service pipe 5, or is stored in the container 1, depending on a control mode selected for the control 6.

The water temperature indicator 11 is mounted on a central portion of the front of the container 1 so that a user may easily observe it. The water temperature indicator 11 mainly includes a water temperature sensor and a water temperature display and is able to immediately show the temperature of water in the container 1.

Figure 2:
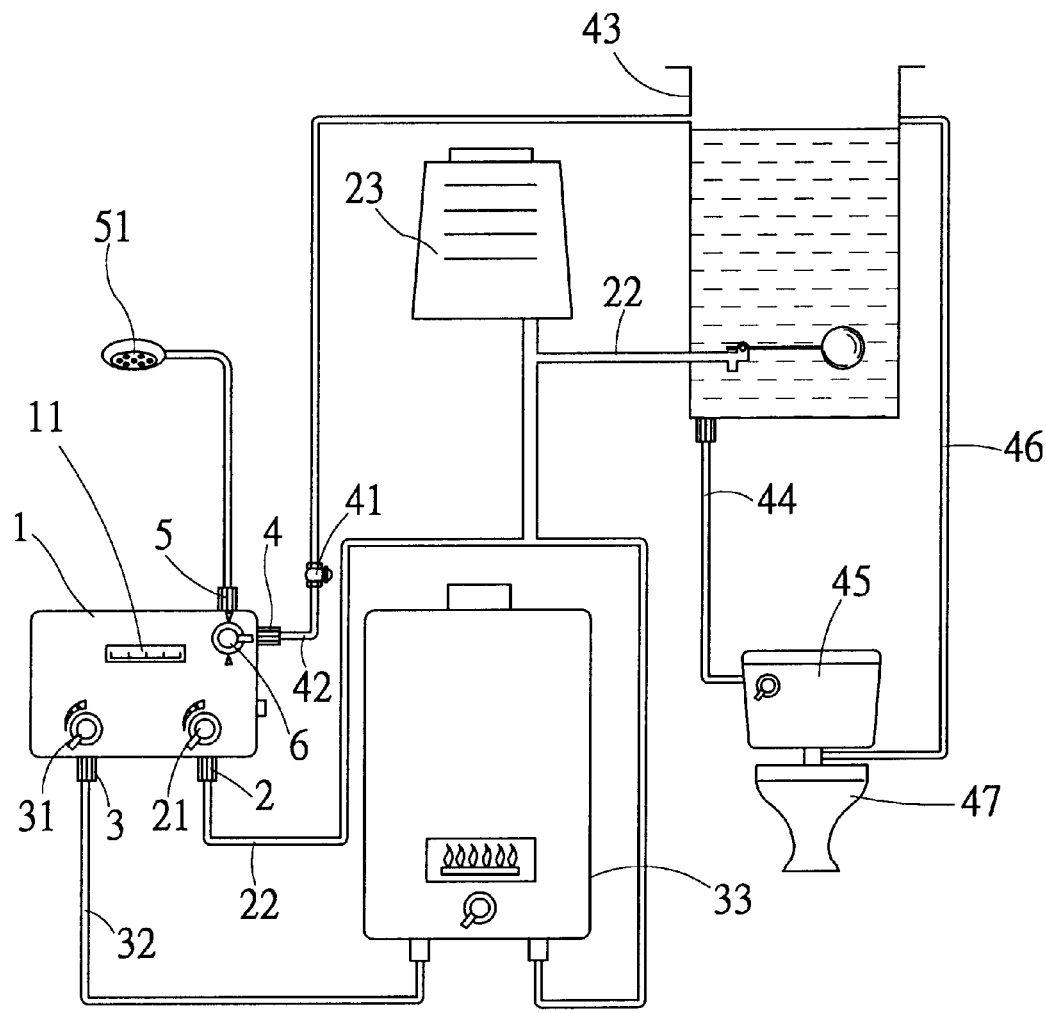
FIG. 2 illustrates the connection of the first embodiment of the present invention of FIG. 1 to a plumbing system in a house.

Please refer to FIG. 2 that illustrates the connection of the water temperature regulator of the present invention to a family plumbing system. The water temperature regulator shown in FIG. 2 is mounted in a bathroom with the cold-water inlet pipe 2 connected to a cold-water supply pipe 22 extended from a water tower 23, the hot-water inlet pipe 3 to a hot-water supply pipe 32 extended from a water heater 33, the discharge pipe 4 to a first pipeline 42 that leads to an upper part of a water storage 43 and has a check valve 41 connected thereto at a predetermined position, and the water service pipe 5 to a second pipeline led to a shower head 51. The water storage 43 is provided at a bottom with a third pipeline 44 that leads to a water tank 45 of a toilet 47. The cold-water supply pipe 22 extended from the water tower 23 has a branch that extends into a lower part of the water storage 43 and has a float-ball switch 48 connected to an end of the cold-water supply pipe branch 22.

When a user wants to, for example, take a shower, and it is assumed the water heater 33 is used for the first time on that day, the user may first turn the control 6 to open the discharge pipe 4 and then turns open cold-water and hot-water faucets for cold water and hot water to flow from the cold-water supply pipe 22 and the hot-water supply pipe 32 into the container 1 via the cold-water inlet pipe 2 and the hot-water inlet pipe 3, respectively. Since the discharge pipe 4 is opened, cold and hot water flown into the container 1 would finally flow out the container 1 via the discharge pipe 4 and into the water storage 43 via the water pipe 42. The cold-water flow control 21 and the hot-water flow control 31 may be turned to respectively regulate flow of the cold and the hot water into the container 1. Meanwhile, the user may observe the water temperature display of the water temperature indicator 11 for a temperature of the water in the container 1. When the observed temperature of water is suitable for shower and meets the user's preference, the control 6 may be switched to close the discharge pipe 4 and open the water service pipe 5, so that water in the container 1 is supplied via the water service pipe 5 to the shower head 51 for use. With these arrangements, any water flowing into the container 1 and not reaching a desired water temperature could be discharged from the discharge pipe 4 to the water storage 43 via the first pipeline 42 for reuse later without being unnecessarily wasted. In the example illustrated in FIG. 2, the water flown from the container 1 into the water storage 43 may be supplied to the water tank 45 via the third pipeline 44 for flushing the toilet 47. After the shower, the user may switch the control 6 to close both the discharge pipe 4 and the water service pipe 5, making the container 1 in a closed condition. At this point, both cold and hot water supplies are stopped. When the water heater 33 is used for a second time later, for example, by a second user for shower, the user may observe the temperature display of the water temperature indicator 11 for the temperature of water in the container 1. In the case the temperature of water in the container 1 has lowered since last use of the water heater 33, the control 6 may be switched to open the discharge pipe 4 and close the water service pipe 5. When the hot water supplied into the container 1 mixes with the cold water in the container 1 and the temperature of mixed water reaches a desired a value, the control 6 can be switched to close the discharge pipe 4 and open the water service pipe 5 for the hot water to flow to the shower head 51. Again, any water discharged from the container before the water temperature reaches a desired value would flow via the first pipeline 42 to and be collected in the water storage 43 for reuse later without being wasted.

In the case a user is not sure about a value of temperature of water that would be most suitable for shower or meet his or her personal preference, the user might need to test and obtain the preferred water temperature by switching the control 6 more than one time. However, after a preferred or most suitable water temperature has been found through tests and shown on the display of the water temperature indicator 11, the user may, in all future uses of the water temperature regulator of the present invention, conveniently determine whether the suitable or preferred water temperature has been reached simply by observing the temperature value shown in the display 11.

When the present invention is connected to the plumbing system as shown in FIG. 2, water collected in the water storage 43 can not only be guided to the water tank 45 via the third pipeline 44 for flushing the toilet 47 but also be introduced directly to the toilet 47 via a fourth pipeline 46 when a water level in the water storage 43 exceeds a port provided at an upper part of the water storage 43 to which an upper end of the pipeline 46 is connected. On the other hand, when the water level in the water storage 43 is low, the float-ball switch 48 functions to admit water in the water tower 23 into the water storage 43 via the water pipe branch 22, allowing water in the water tank 45 always at a full level.

Figure 3:
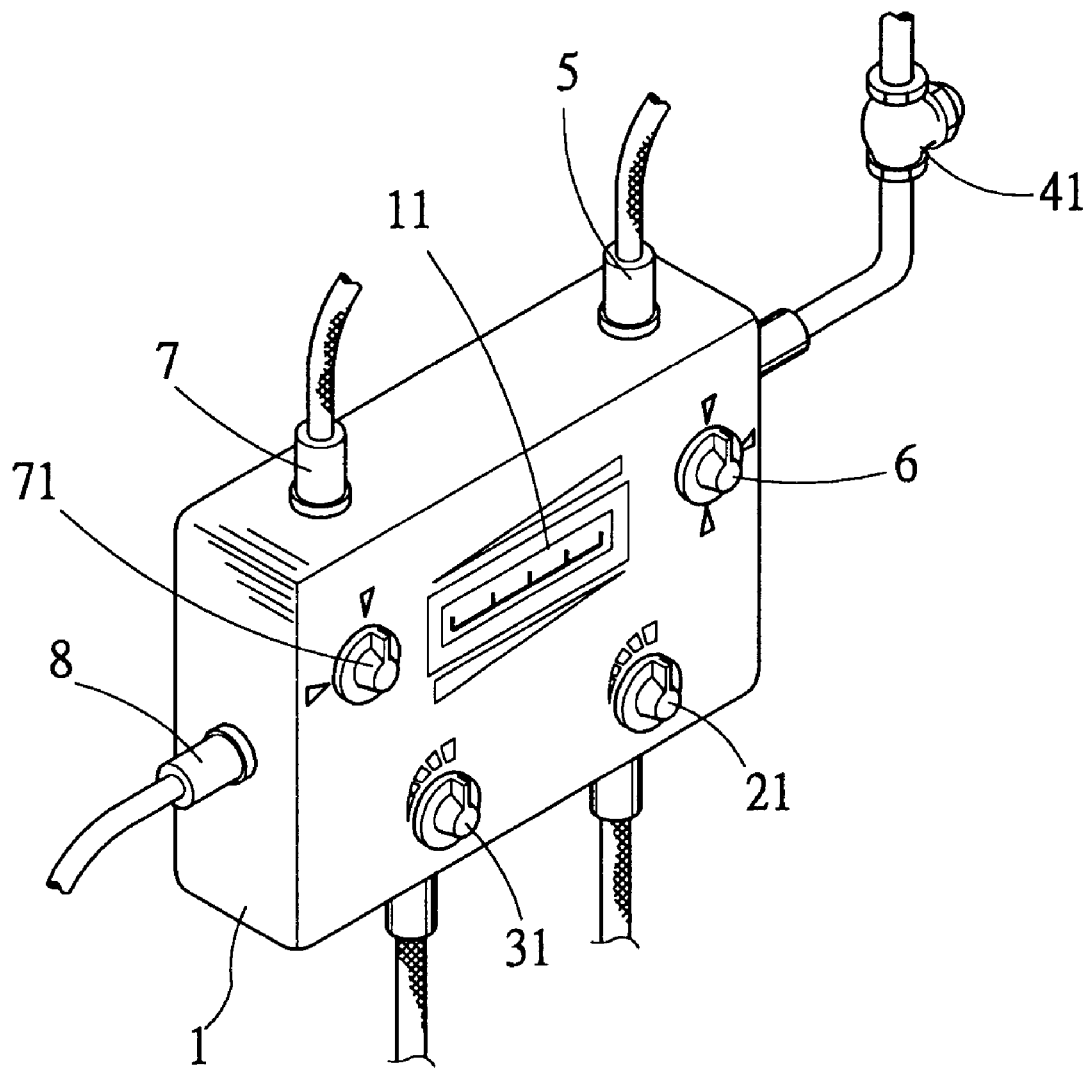
FIG. 3 is a perspective of a second embodiment of the present invention.
Figure 4:
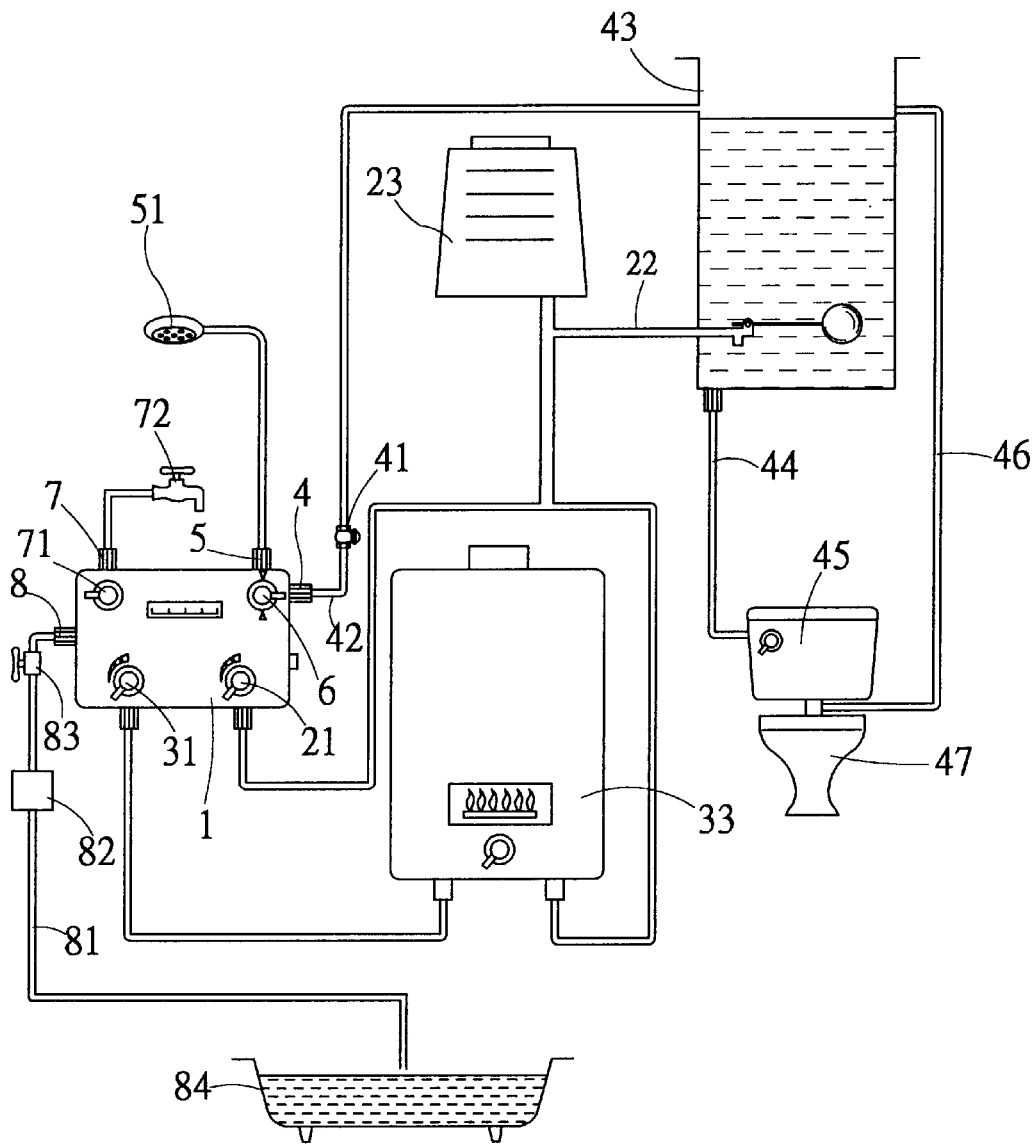
FIG. 4 illustrates the connection of the second embodiment of the present invention of FIG. 3 to a plumbing system in a house.

It is to be noted that the water temperature regulator of the present invention is not limited to have only one water service pipe 5. FIG. 3 illustrates a second embodiment of the present invention that is similar to the water temperature regulator according to the first embodiment of the present invention, except that it has an additional water service pipe 7 provided on the top of the container 1 near a left side thereof, and an admission pipe 8 provided at a central portion of a left wall of the container 1. A second control 71 is provided at a top left corner of the front of the container 1 to control the open or close of the additional water service pipe 7. Please now refer to FIG. 4 that illustrates the connection of the water temperature regulator according to the second embodiment of the present invention to a family plumbing system. As shown, the connections of all components that are similar to the first embodiment of the present invention are the same as that shown in FIG. 2. However, the additional water service pipe 7 is led to a faucet 72 and the admission pipe 8 is connected to a fifth pipeline 81 that leads to a bathtub 84 and has a pump 82 and a cock 83 connected thereto. When the control 6 is set to close both the water service pipe 5 and the discharge pipe 4, the second control 71 can be turned to open the additional water service pipe 7 for water of suitable temperature in the container 1 to flow to the faucet 72 via the water service pipe 7. And, when the cold-water and the hot-water flow controls 21 and 31, respectively, are both closed, the pump 82 could be actuated to pump used water in the bathtub 84 into the water temperature regulator of the present invention for sending to the water storage 43. Thereby, used water in the bathtub 84 may be recycled via the present invention.

Figure 5:
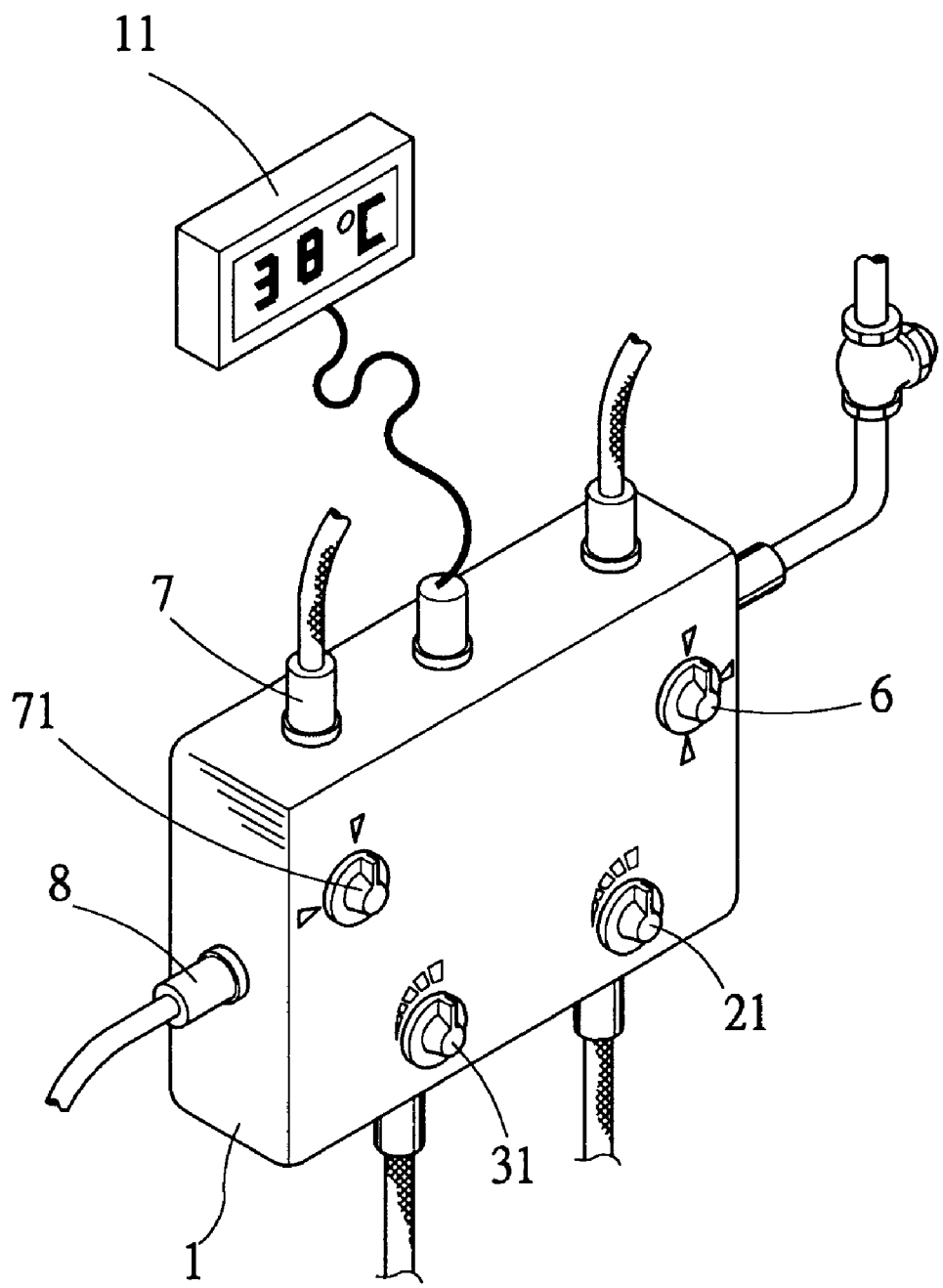
FIG. 5 shows another type of water temperature indicator used in the present invention.

The temperature display of the water temperature indicator 11 of the present invention is not limited to a mechanical or an electronic type. However, when the temperature display is of an electronic type, as that shown in FIG. 5, it is preferable to mount it outside the container 1 and remotely connect to the container 1 via a suitable wire.

Moreover, it is not a prerequisite to have a three-mode control 6 provided on the container 1 for controlling the open or close of the discharge pipe 4 and the water service pipe 5. Instead, the discharge pipe 4 and the water service pipe 5 may have their own independent control for controlling the open and close thereof.

With the above arrangements, the water temperature regulator of the present invention is not only novel in its structure but also practical in use with respect to its function of helping general consumers to recycle waste water and save valuable water resource and heat energy.

What is to be noted is the form of the present invention shown and disclosed is to be taken as a preferred embodiment of the invention and that various changes in the shape, size, and arrangements of parts may be resorted to without departing from the spirit of the invention or the scope of the subjoined claims.

What is claimed is:

1. A water temperature regulator suitable for connecting to a family plumbing system, comprising a closed container on which a cold-water inlet pipe, a hot-water inlet pipe, a discharge pipe, a first water service pipe, a first control, and a water temperature indicator are provided;

said cold-water inlet pipe being connected to a cold-water pipe in the family plumbing system in order to introduce cold water into said container, and having a cold-water flow control connected thereto for regulating a flow of the cold water being introduced into said container via said cold-water inlet pipe;

said hot-water inlet pipe being connected to a hot-water pipe in the family plumbing system in order to introduce hot water into said container, and having a hot-water flow control connected thereto for regulating a flow of the hot water being introduced into said container via said hot-water inlet pipe;

said discharge pipe being connected to a first pipeline in the family plumbing system for discharging water in said container to a water storage via said first pipeline, and said first pipeline having a check valve connected to a predetermined position thereof to prevent water from flowing back into said container via said discharge pipe;

said first water service pipe being led to a water supply outlet to allow water in said container to flow to said water supply outlet via said water service pipe;

said first control controlling open/close of said discharge pipe and said water service pipe at different time or close of said discharge pipe and said water service pipe at the same time, so that water in said container either flows out said container via said discharge pipe or said water service pipe or is stored in said container, depending on one of three control modes selected for said control; and said water temperature indicator including a water temperature sensor and a water temperature display and being able to immediately show a temperature of water in said container.

2. A water temperature regulator as claimed in claim 1, wherein said water supply outlet is a shower head.

3. A water temperature regulator as claimed in claim 1, wherein said water storage is connected at a bottom outlet to a second pipeline that is extended to a water tank of a toilet.

4. A water temperature regulator as claimed in claim 2, wherein said water storage is connected at a bottom outlet to a second pipeline that is extended to a water tank of a toilet.

5. A water temperature regulator as claimed in claim 3, wherein said container further comprises a second water service pipe that is led to a faucet, and a second control that controls open/close of said second water service pipe and accordingly water supply to said faucet via said second water service pipe.

6. A water temperature regulator as claimed in claim 4, wherein said container further comprises a second water service pipe that is led to a faucet, and a second control that controls open/close of said second water service pipe and accordingly water supply to said faucet via said second water service pipe.

7. A water temperature regulator as claimed in claim 3, wherein said first control includes two independent switches for separately controlling open/close of said discharge pipe and of said first water service pipe.

8. A water temperature regulator as claimed in claim 4, wherein said first control includes two independent switches for separately controlling open/close of said discharge pipe and of said first water service pipe.

9. A water temperature regulator as claimed in claim 5, wherein said first control includes two independent switches for separately controlling open/close of said discharge pipe and of said first water service pipe.

10. A water temperature regulator as claimed in claim 6, wherein said first control includes two independent switches for separately controlling open/close of said discharge pipe and of said first water service pipe.

\* \* \* \* \*